(12) United States Patent
de Silva

(10) Patent No.: US 10,019,376 B2
(45) Date of Patent: Jul. 10, 2018

(54) MEMORY SYSTEM AND OPERATING METHOD THEREOF

(71) Applicant: SK hynix Inc., Gyeonggi-do (KR)

(72) Inventor: Ambrose Gihan de Silva, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 112 days.

(21) Appl. No.: 15/148,878

(22) Filed: May 6, 2016

(65) Prior Publication Data

US 2017/0147503 A1    May 25, 2017

(30) Foreign Application Priority Data

Nov. 19, 2015    (KR) .................. 10-2015-0162567

(51) Int. Cl.
| | | |
|---|---|---|
| G06F 12/10 | (2016.01) | |
| G06F 3/06 | (2006.01) | |
| G06F 12/1009 | (2016.01) | |
| G06F 12/02 | (2006.01) | |

(52) U.S. Cl.
CPC .......... *G06F 12/1009* (2013.01); *G06F 3/061* (2013.01); *G06F 3/0604* (2013.01); *G06F 3/0616* (2013.01); *G06F 3/0625* (2013.01); *G06F 3/0634* (2013.01); *G06F 3/0652* (2013.01); *G06F 3/0656* (2013.01); *G06F 3/0688* (2013.01); *G06F 12/02* (2013.01); *G06F 12/0246* (2013.01); *G06F 2212/1021* (2013.01); *Y02D 10/154* (2018.01)

(58) Field of Classification Search
CPC ............................ G06F 12/02; G06F 12/0246
See application file for complete search history.

(56) References Cited

U.S. PATENT DOCUMENTS

| | | | | |
|---|---|---|---|---|
| 7,941,674 | B2 * | 5/2011 | Ziv ..................... | G06F 12/1466 711/200 |
| 2009/0222618 | A1 * | 9/2009 | Cho .................... | G06F 12/0246 711/103 |
| 2009/0310408 | A1 * | 12/2009 | Lee ..................... | G11C 11/5628 365/185.03 |
| 2010/0146193 | A1 * | 6/2010 | Jang ................... | G06F 12/0804 711/103 |
| 2010/0262765 | A1 * | 10/2010 | Cheon .................. | G06F 3/0613 711/103 |
| 2011/0138148 | A1 * | 6/2011 | Friedman .............. | G06F 3/0613 711/173 |

(Continued)

FOREIGN PATENT DOCUMENTS

| | | |
|---|---|---|
| KR | 1020110032343 | 3/2011 |
| KR | 101028929 | 4/2011 |

(Continued)

*Primary Examiner* — Charles Rones
*Assistant Examiner* — Tian-Pong Chang
(74) *Attorney, Agent, or Firm* — IP & T Group LLP

(57) ABSTRACT

A memory system includes a memory device including first and second storage regions, each comprising a plurality of memory blocks and a controller suitable for selecting a first mode or a second mode based on a method for accessing data stored in the memory device and mapping a logical address of the data into a physical address of the first storage region in the first mode and into a physical address of the second storage region in the second mode.

19 Claims, 13 Drawing Sheets

(56) References Cited

U.S. PATENT DOCUMENTS

2012/0311228 A1* 12/2012 Hsu ..................... G06F 12/0246
711/102
2014/0244892 A1* 8/2014 Goss ..................... G06F 3/0653
711/102

FOREIGN PATENT DOCUMENTS

| KR | 101179027 | 8/2012 |
| KR | 1020140111588 | 9/2014 |

* cited by examiner

MEMORY SYSTEM AND OPERATING METHOD THEREOF

CROSS-REFERENCE TO RELATED APPLICATION

The present application claims priority of Korean Patent Application No. 10-2015-0162567, filed on Nov. 19, 2015, which is incorporated herein by reference in its entirety.

TECHNICAL FIELD

Exemplary embodiments of the present invention relate to a method for managing a memory device, and more particularly, to a memory system for dividing and managing a storage region of a memory device based on a method for accessing data stored in the memory device and an operating method thereof.

DISCUSSION OF THE RELATED ART

The computer environment paradigm has shifted to ubiquitous computing systems that can be used anytime and anywhere. Due to this, use of portable electronic devices, such as mobile phones, digital cameras, and notebook computers has rapidly increased. These portable electronic devices generally use a memory system having one or more semiconductor memory devices as a data storage for storing data. The semiconductor memory devices are referred to hereinafter for convenience simply as memory devices. Memory systems may be used as main or auxiliary memory devices of portable electronic devices.

Memory systems using semiconductor memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system capable of dividing and managing a storage region of data based on a method for accessing data and an operating method thereof.

In an embodiment, a memory system may include a memory device including first and second storage regions, each comprising a plurality of memory blocks and a controller suitable for selecting a first mode or a second mode based on a method for accessing data stored in the memory device and mapping a logical address of the data into a physical address of the first storage region in the first mode and into a physical address of the second storage region in the second mode.

Furthermore, the method for accessing the data may include spatial locality including information on whether the data is random data or sequential data. The controller may select the first mode in case of the random data, and selects the second mode in case of the sequential data.

Furthermore, the controller may include a mode selection unit suitable for generating a first selection signal in case of the random data, and a second selection signal in case of the sequential data and an address mapping unit comprising a first mapping table and a second mapping table enabled in response to the first selection signal and the second selection signal, respectively.

Furthermore, the first mapping table may perform address mapping based on a page and the second mapping table may perform address mapping based on a log block.

Furthermore, the controller may additionally select a plurality of sub-operating modes based on temporal locality including information on whether the data is hot data or cold data, in the second mode.

Furthermore, the controller may select a cyclic buffer mode or a full log mode as the plurality of sub-operating modes depending on whether the sequential data is hot data or cold data.

Furthermore, the memory blocks of the second storage region may include a plurality of data blocks suitable for storing the sequential data and a plurality of log blocks suitable for operating as a write buffer and storing update data of data stored in the plurality of data blocks.

Furthermore, when the number of open blocks of the memory blocks of the second storage region is smaller than a reference value in the full log mode, an open block may be secured by the merging valid pages of a target block of the data blocks and a log block corresponding to the target block.

Furthermore, the target block may include a block which has a largest number of invalid pages or a smallest number of programs/erasures, among the data blocks.

Furthermore, when the number of open blocks of the memory blocks of the second storage region is smaller than a reference value in the cyclic buffer mode, an open block may be secured by deleting a target block of one of the data blocks and the log blocks.

Furthermore, the target block may include a block which has the largest number of invalid pages or a smallest number of programs/erasures, among the data blocks or the log blocks. A valid page included in the target block may be copied to the log block by checking an importance of the valid page before deleting the target block.

Furthermore, a ratio of the number of log blocks to the number of data blocks may be greater in the cyclic buffer mode than in the full log mode.

In an embodiment, an operating method of a memory system may include determining spatial locality for data stored in a memory device comprising a first storage region and a second storage region, each comprising a plurality of memory blocks and mapping a logical address of the data into a physical address of one of the first and second storage regions based on a result of the determination.

Furthermore, the determining of the spatial locality for the data may include determining whether the data is random data or sequential data.

Furthermore, the mapping of the logical address of the data may include mapping the logical address of the data into the physical address of the first storage region based on a page when the data is the random data and mapping the logical address of the data into the physical address of the second storage region based on a log block when the data is the sequential data.

The operating method may further include determining temporal locality for the data and controlling a ratio of log blocks to data blocks of the plurality of memory blocks of the second storage region based on a result of the determination, when the data is the sequential data.

Furthermore, the determining of the temporal locality may include determining whether the data is cold data or hot data.

Furthermore, a marginal block may be secured by merging the data block and the log block when the data is the cold data.

Furthermore, a marginal block may be secured by deleting and circulating the data block or the log block when the data is the hot data.

Furthermore, the controlling of the ratio of the log blocks to the data blocks may include reducing a proportion of the log blocks when the data is cold data and increasing a proportion of the log block when the data is hot data.

DETAILED DESCRIPTION

Figure 1:
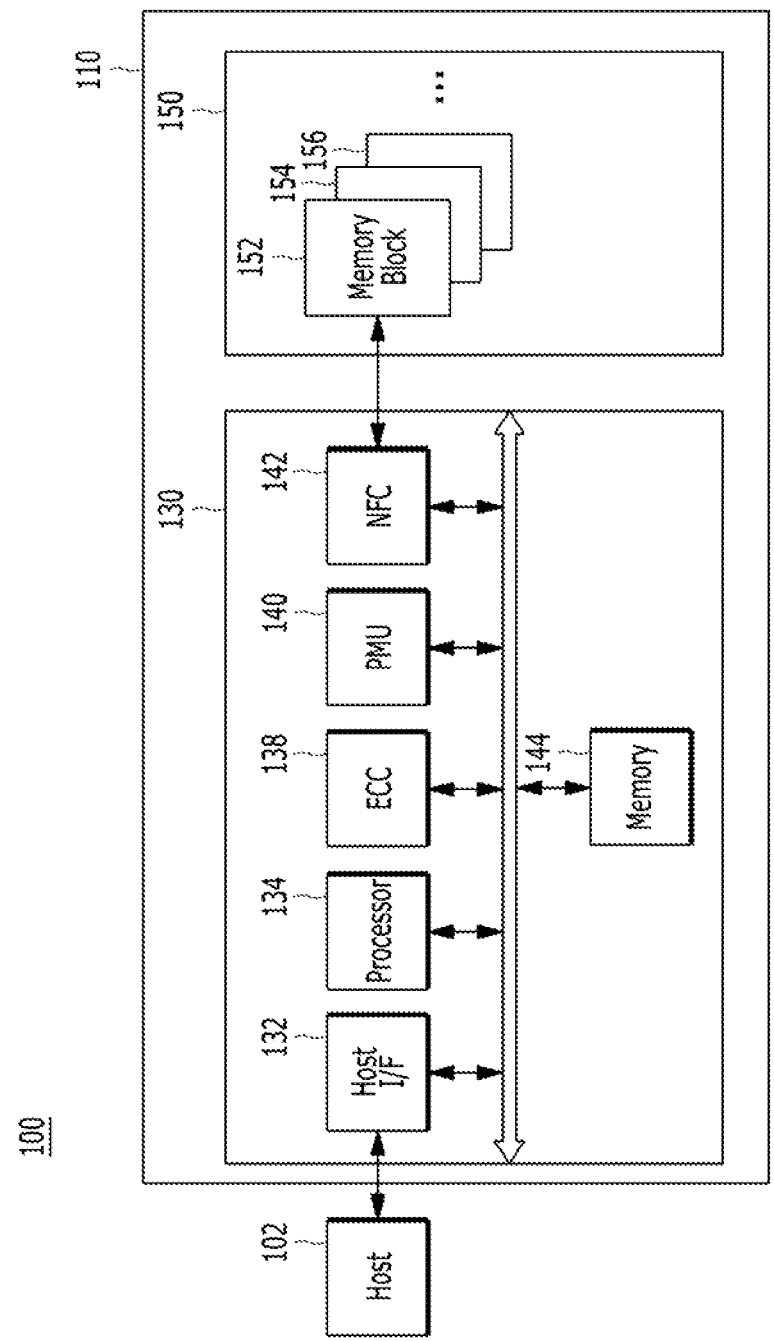
FIG. 1 is a diagram illustrating a data processing system including a memory system, according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the relevant art. Throughout the disclosure, like reference numerals refer to like parts throughout the various figures and embodiments of the present invention.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example, the controller may store data provided from the host 102 into the memory device 150 in response to a write request.

Any suitable controller may be used. For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example, a low density parity check (LDPC) code, a Bose-Chaudhurl-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be or comprise a volatile memory. For example, the memory 144 may be or comprise a static random access memory (SRAM) or a dynamic random access memory (DRAM). As described above, the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example, the processor 134 may control a write operation for the memory device 150, in response to a write request from the host 102. Also, for example, the processor 134 may control a read operation for the memory device 150, in response to a read request from the host 102. The processor 134 may drive a firmware, also referred to as a flash translation layer (FTL), for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management, the data of the program-failed memory blocks (e.g., the bad memory blocks) may be programmed into a new memory block. The bad blocks due to a program fail may seriously deteriorate the utilization efficiency of a memory device, especially one having a 3D stack structure and thus negatively affect the reliability of the memory system 110.

Figure 2:
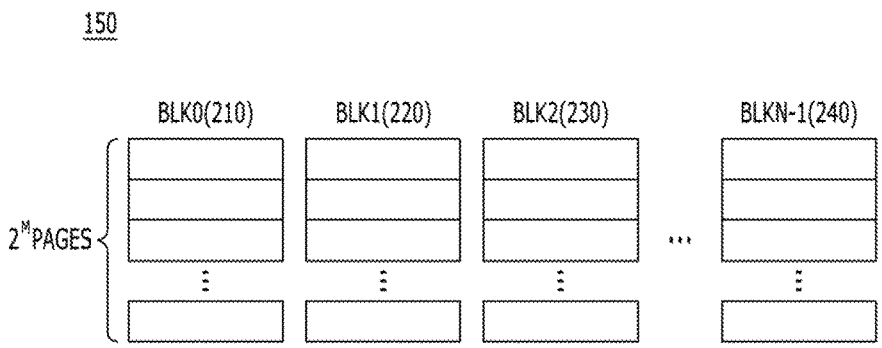
FIG. 2 is a diagram illustrating a memory device including a plurality of memory blocks, according to an embodiment of the present invention.

Referring to FIG. 2 the memory device 150 may include a plurality of memory blocks, for example, zeroth to $(N-1)^{th}$ blocks 210 to 240, where N is a positive integer. Each of the plurality of memory blocks 210 to 240 may include a plurality of pages, for example, $2^M$ number of pages ($2^M$ PAGES), where M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
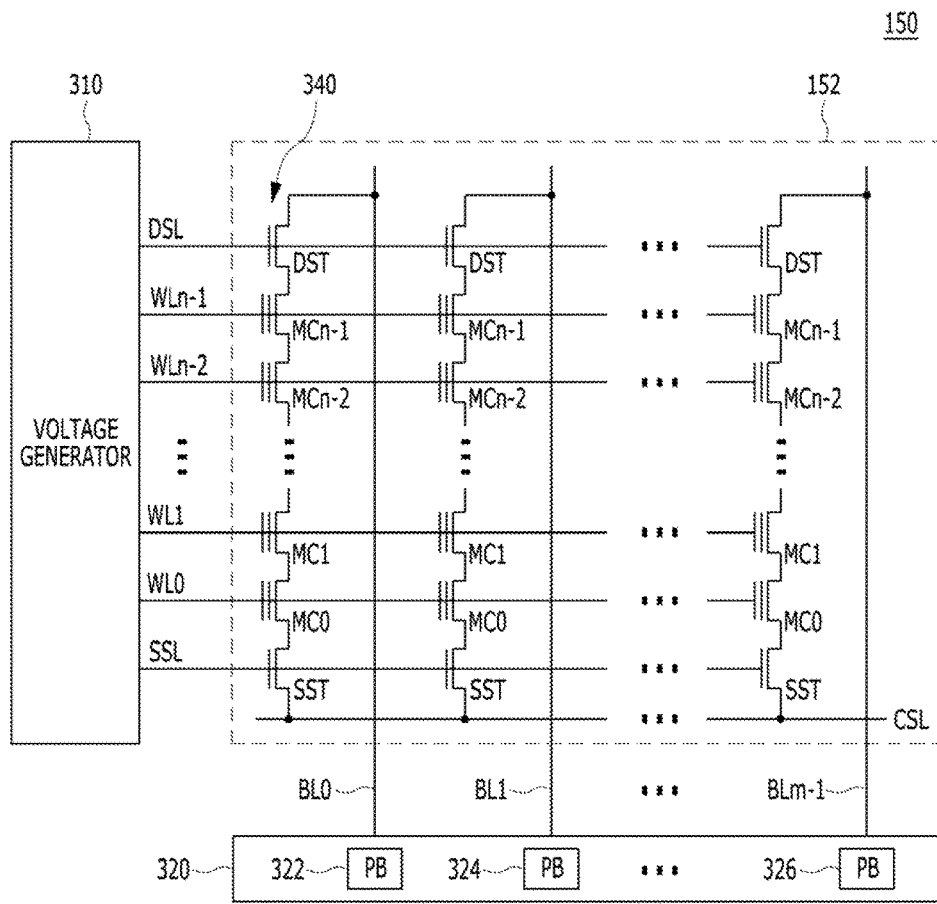
FIG. 3 is a circuit diagram illustrating a memory block of a memory device, according to an embodiment of the present invention.

Referring to FIG. 3, a memory block 152 of the memory device 150 may include a plurality of cell strings 340 coupled electrically to bit lines BL0 to BLm−1, respectively. Each cell string 340 may include at least one drain select transistor DST and at least one source select transistor SST. A plurality of memory cells or a plurality of memory cell transistors MC0 to MCn−1 may be coupled electrically in series between the select transistors DST and SST. The respective memory cells MC0 to MCn−1 may consist of multi-level cells (MLC) each of which stores data information of a plurality of bits. The memory cells may have any suitable architecture.

In FIG. 3, 'DSL' denotes a drain select line, 'SSL' denotes a source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments, by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
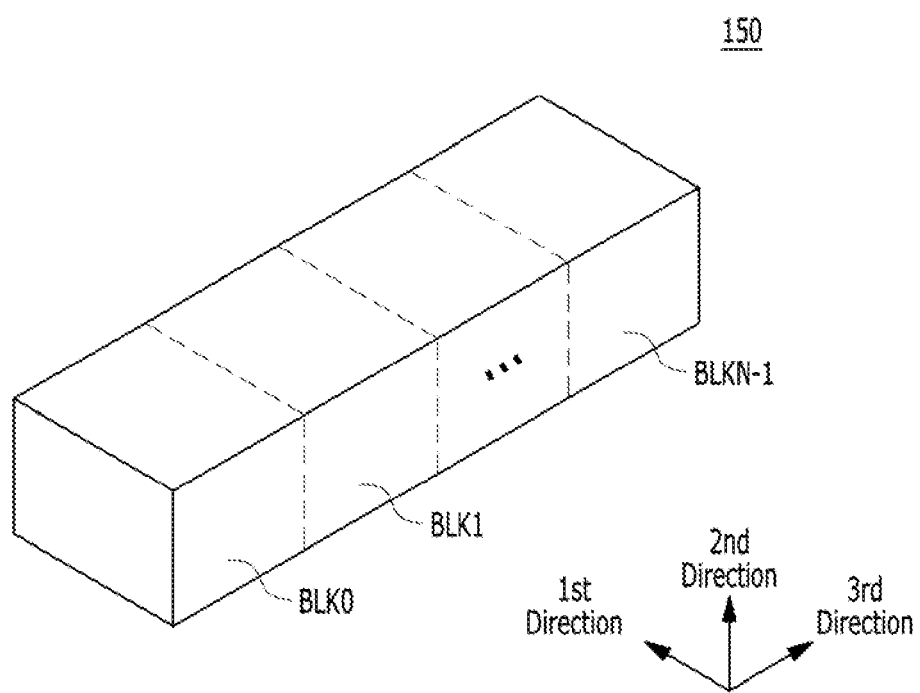
FIGS. 4 to 11 are diagrams schematically illustrating a memory device, according to various embodiments of the present invention.

FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN−1. Each of the memory blocks BLK0 to BLKN−1 may be realized in a 3D structure or a vertical structure. The respective memory blocks BLK0 to BLKN−1 may include a plurality of structures extending in first to third directions, for example, an x-axis direction, a y-axis direction and a z-axis direction.

Figure 8:
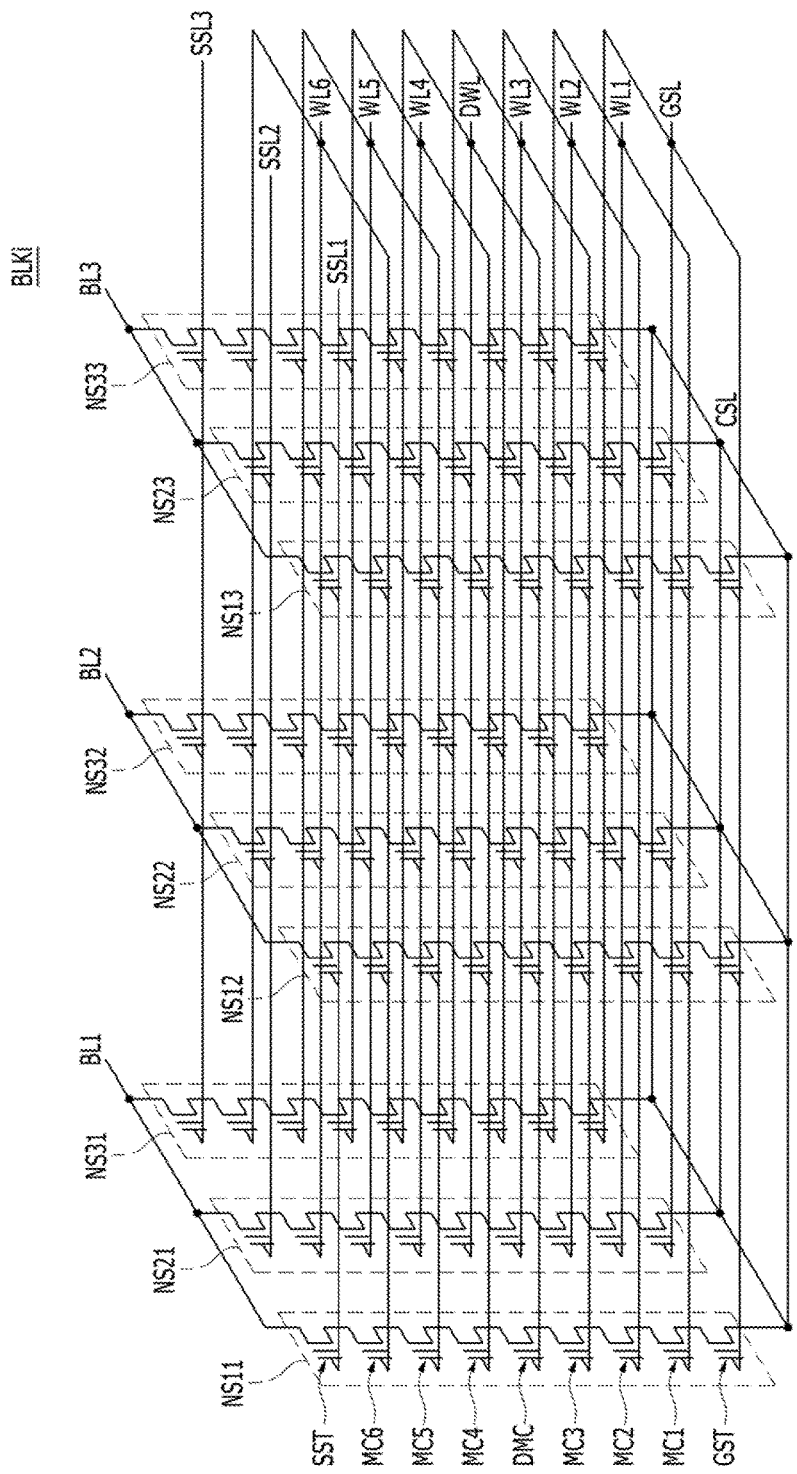

The respective memory blocks BLK0 to BLKN−1 may include a plurality of NAND strings NS extending in the second direction (FIG. 8). The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN−1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
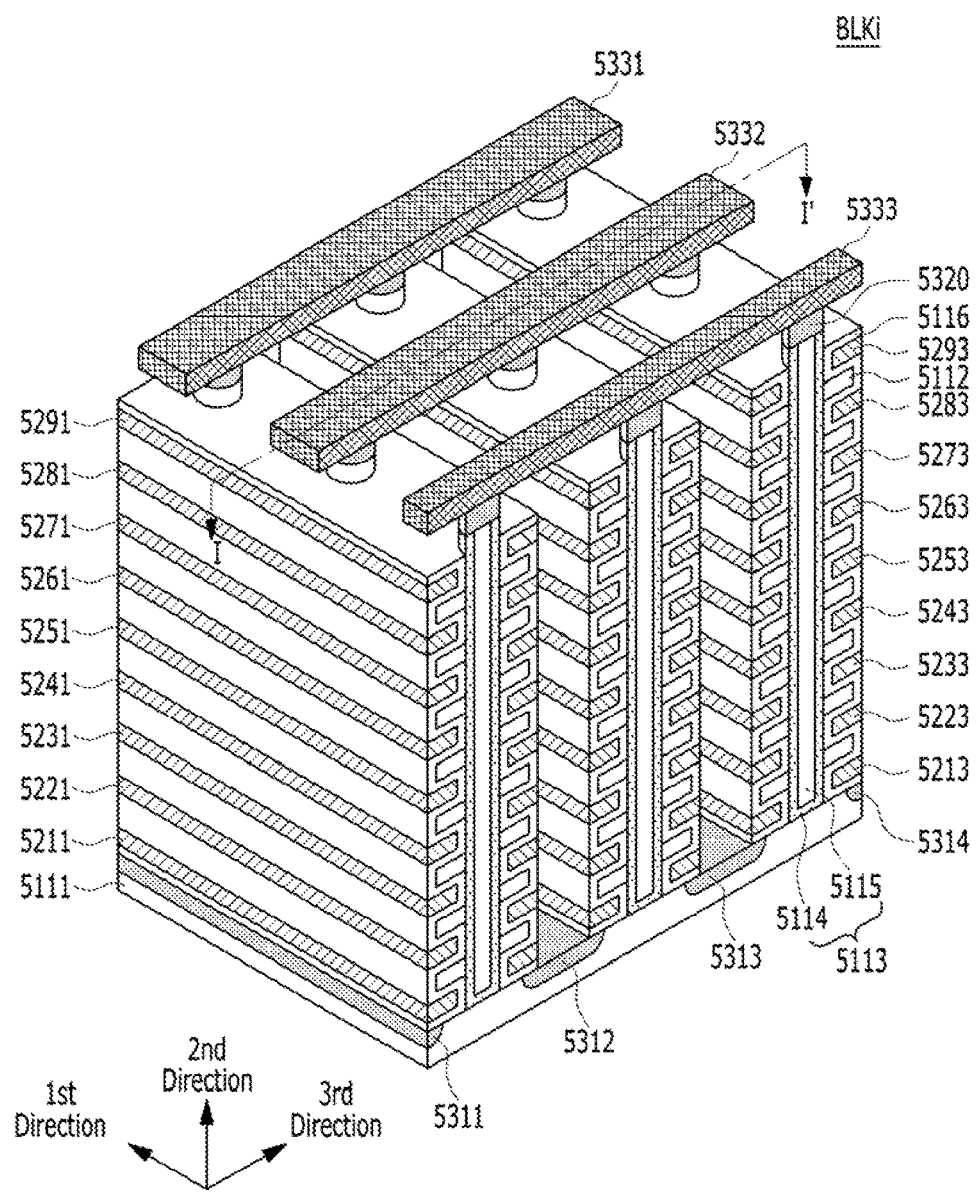
Figure 6:
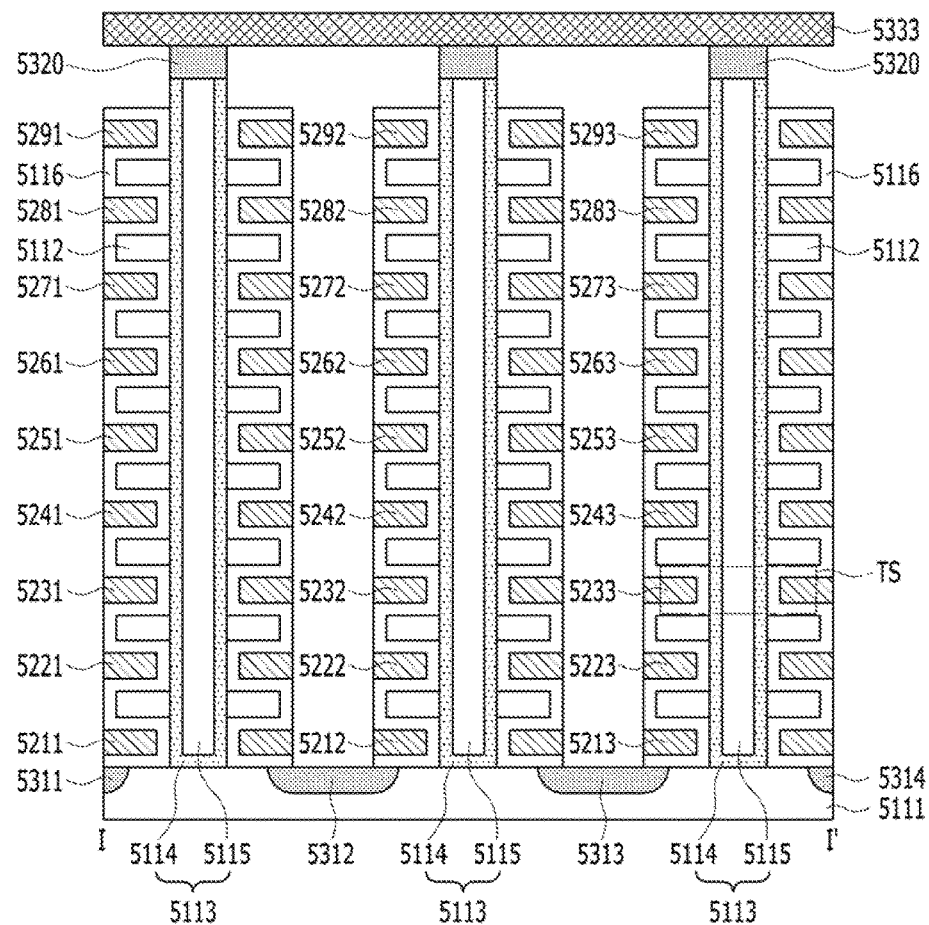

FIG. 5 is a perspective view of one memory block BLKi of the plurality memory blocks BLK0 to BLKN−1 shown in FIG. 4. FIG. 6 is a cross-sectional view taken along a line I-I' of the memory block BLKi shown in FIG. 5.

Referring to FIGS. 5 and 6, memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between (i) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon, it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
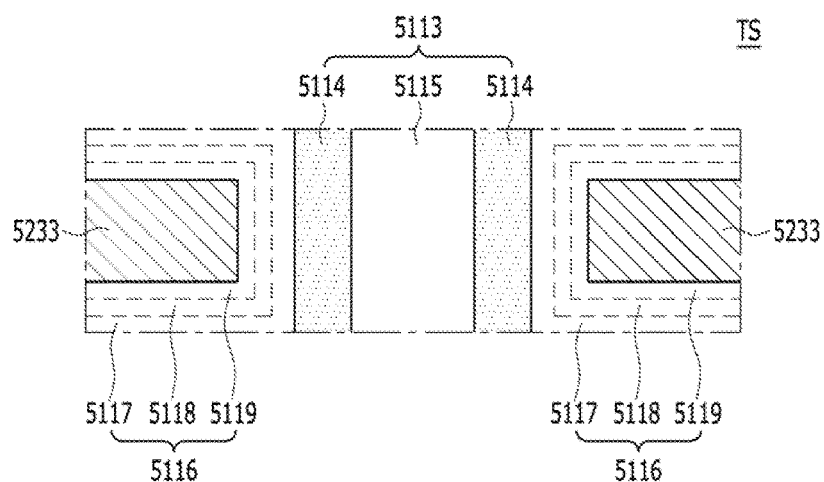

Referring now to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are coupled electrically to one-bit line BL, it is noted that the embodiment is not limited thereto. In the memory block BLKi, m NAND strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6, extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, the NAND strings NS arranged in the same row as the selected source line may be selected.

Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
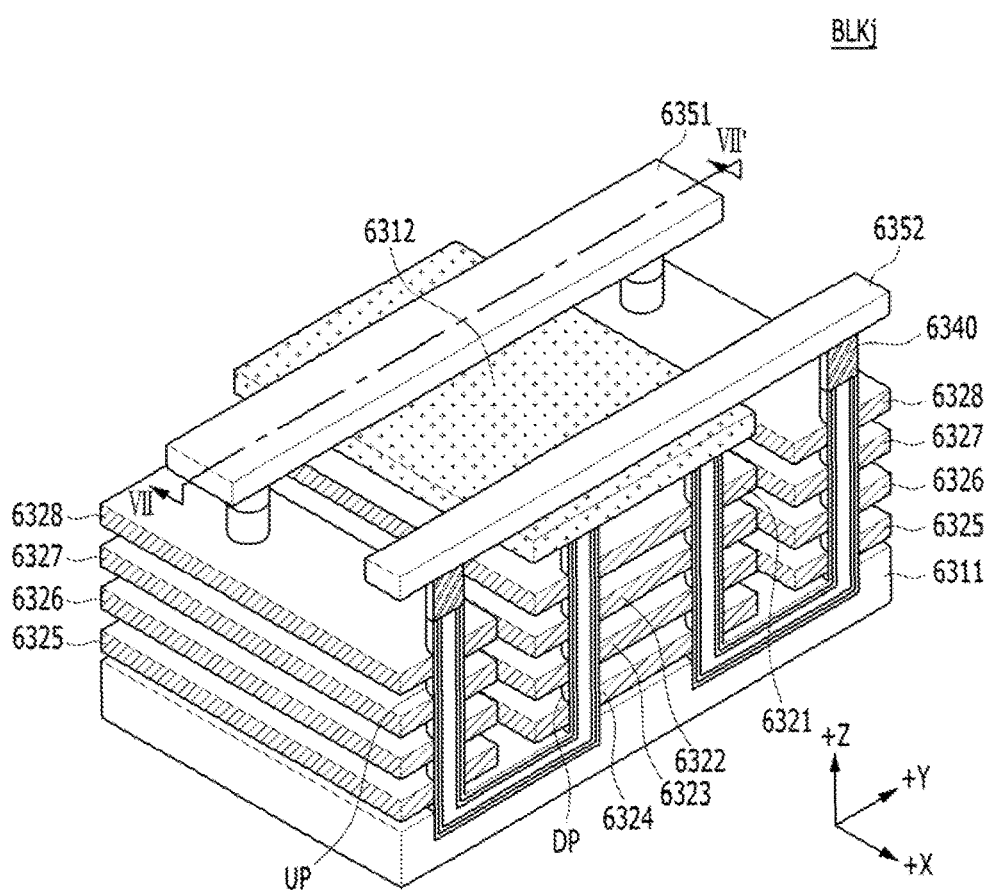

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
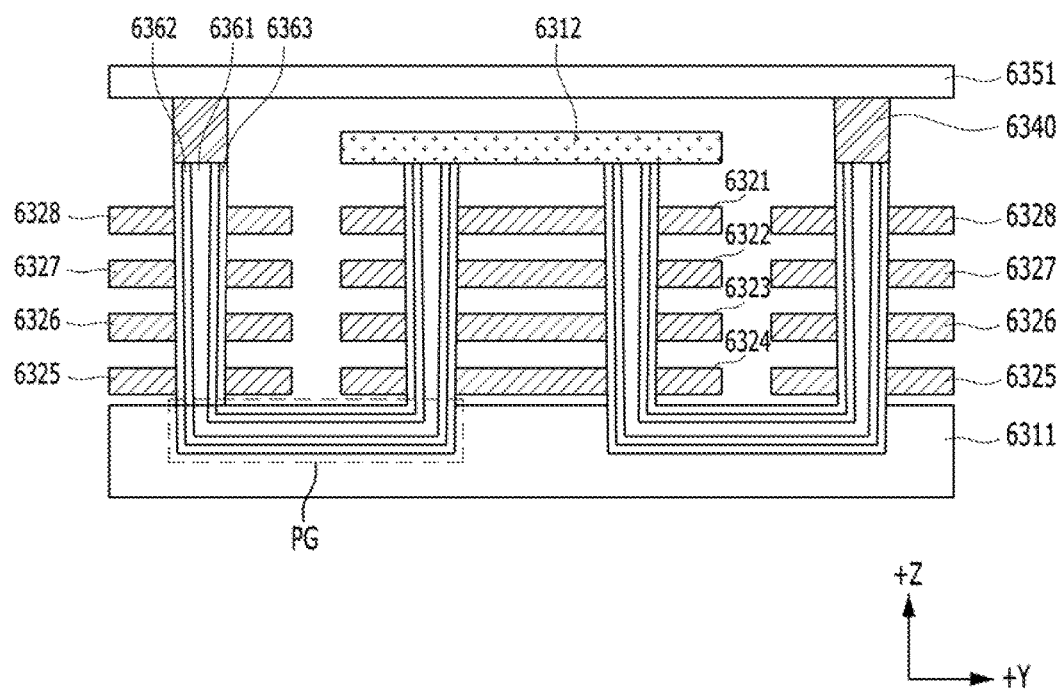

Referring to FIGS. 9 and 10, the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 extending in the y-axis direction may be provided over the drains 6340.

The first and second upper conductive material regions 6351 and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
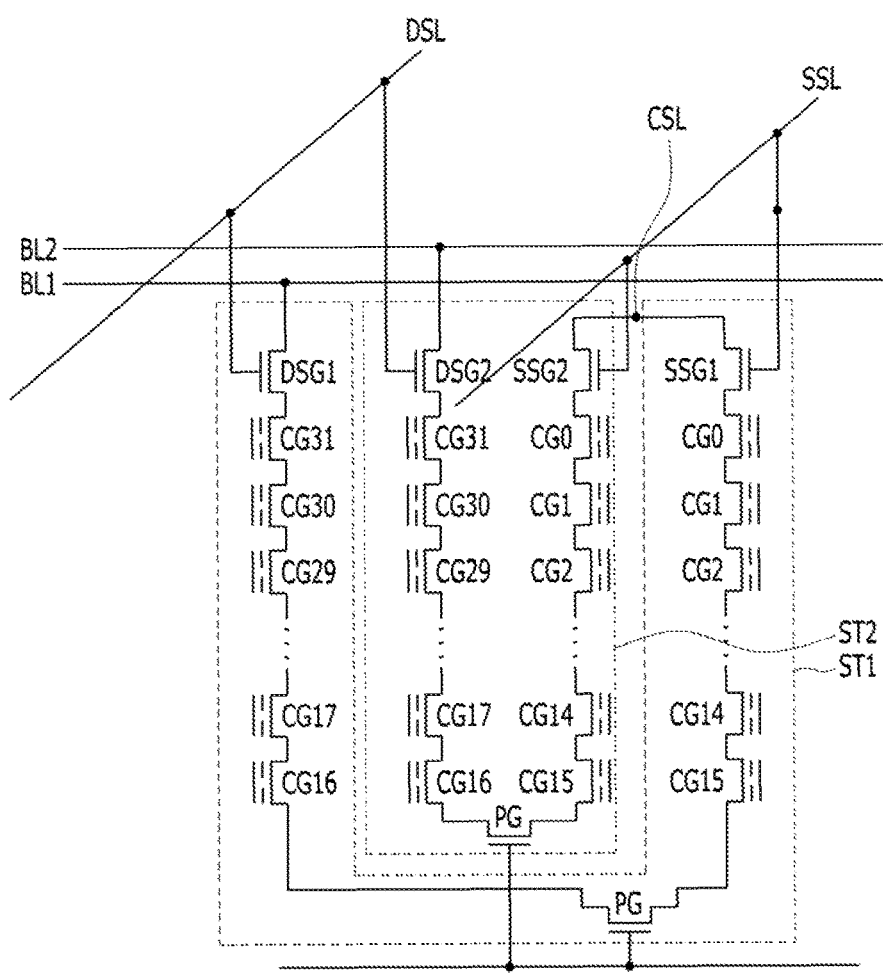

FIG. 11 is a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

Hereinafter, an operation of a memory system for dividing and managing a storage region of a memory device based on a method for accessing data stored in the memory device, according to an embodiment of the present invention, will be described in detail with reference to FIGS. 12 to 15.

Figure 12:
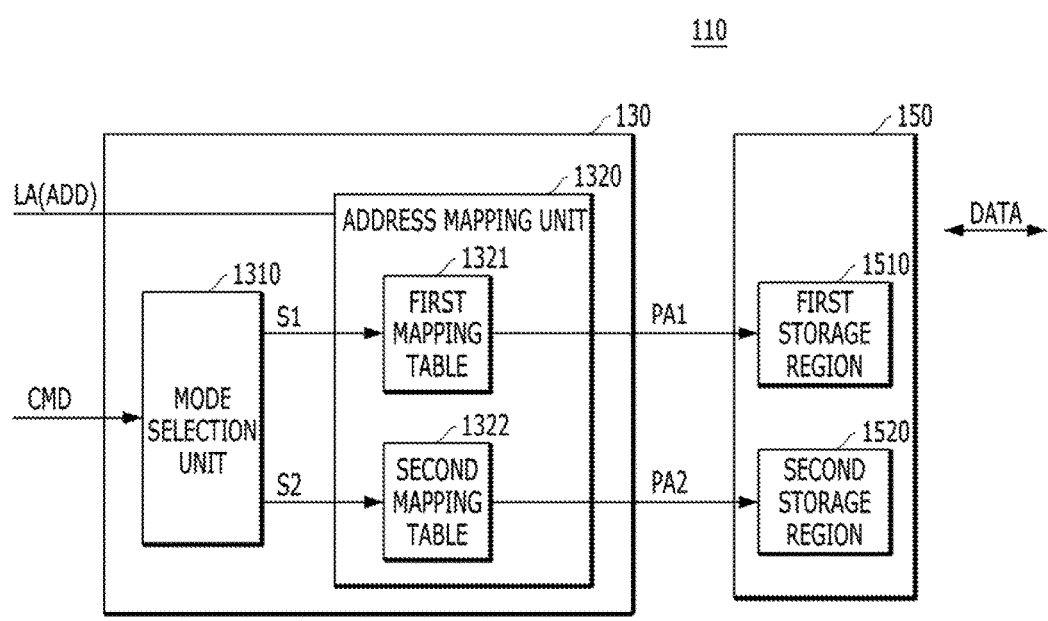
FIG. 12 is a diagram showing a memory system supporting various methods for accessing data, according to an embodiment of the present invention.

FIG. 12 is a diagram showing a memory system 110, according to an embodiment of the present invention.

Referring to FIG. 12, a memory system 110 may include a controller 130 and a memory device 150. The memory system 110 shown in FIG. 12 may have the same configuration as the memory system 110 shown in FIG. 1. For example, the controller 130 and the memory device 150 of the memory system of FIG. 12 may have the same configurations of the controller 130 and the memory device 150 of FIG. 1. For convenience, the following description will focus in explaining any additional features of the embodiment of FIG. 12.

Accordingly, the memory system 110 may perform an operation for storing data received from a host (102 of FIG. 1) in the memory device 150, and outputting data stored in the memory device 150 to the host 102 in response to a command CMD and an address ADD received from the host 102.

In this case, in order to write new data into a region of the memory device 150, for example into a page of the memory device 150, in which data has been previously stored, i.e., in order to update the region with the new data, the region needs to be first erased. If an erase operation is performed for every data update, however, operating speed and or efficiency of the semiconductor system 110 may be deteriorated.

The memory system 110 may perform a data update by invalidating an existing region in which data has been stored and storing data to be updated in a new region. For example, the memory system 110 may perform an operation for mapping each piece of positional information. That is, the controller 130 of the memory system 110 may drive firmware, such as a flash transformation layer (FTL), as described above, and access a corresponding region by mapping a logical address LA, received from the host 102, into a physical address PA of the memory device 150. The FTL manages one or more address mapping tables for supporting the address mapping operation.

As shown in FIG. 12, for supporting various address mapping operations according to an embodiment of the present invention, the controller 130 may include a mode selection unit 1310 and an address mapping unit 1320. The address mapping unit 1320 may include a first and second mapping tables 1321 and 1322.

The host 102 may read or write sequentially data stored in the memory device 150. That is, right after having read data of an N address (N is a natural number), the host 102 may read data of an N+1 address. This characteristic of the host 102 may also be referred to hereinafter as the host having spatial locality. Also a method of accessing data stored in the memory device 150 in a sequential manner will be referred to as a method of accessing data having spatial locality. Furthermore, the host 102 may access data that have been accessed previously at least once again. In other words, host 102 may re-access the once accessed data within a relatively short time. This characteristic of the host 102 may also be referred to as the host having temporal locality. Also, a method of accessing data which have been previously accessed at least once within a relatively short period of time will be referred to as a method of accessing data having a temporal locality.

The mode selection unit 1310 may determine an access method to the memory device 150 based on the command CMD received from the host 102. The mode selection unit 1310 may select an operating mode of the memory system 110 depending on whether the access method has spatial locality including information on whether data is random data or sequential data. As a result, the mode selection unit 1310 may selectively output a first selection signal S1 or a second selection signal S2. For example, the mode selection unit 1310 may output the first selection signal S1 when access to random data is made by the host 102, and may output the second selection signal S2 when access to sequential data is made by the host 102.

The address mapping unit 1320 may map the logical address LA of the data received from the host 102 into the physical address PA in response to the first selection signal S1 or second selection signal S2 received from the mode selection unit 1310, and output the physical address PA to the memory device 150. When the first selection signal S1 is received from the mode selection unit 1310, the first mapping table 1321 is enabled, and the logical address LA is mapped into a first physical address PA1 which is then sent to the memory device 150. In contrast, when the second selection signal S2 is received from the mode selection unit 1310, the second mapping table 1322 is enabled, and the logical address LA is mapped into a second physical address PA2 which is then sent to the memory device 150.

The memory device 150 may be defined as a first storage region 1510 and a second storage region 1520. Each storage region may include a plurality of memory blocks as shown in FIG. 1. The memory system 110 may access the first and second storage regions 1510 and 1520 in response to the first and second physical addresses PA1 and PA2, respectively.

An operation for mapping the logical address LA into the first and second physical addresses PA1 and PA2 and an operation for processing data in the first and second storage regions 1510 and 1520 in response to the first and second physical addresses PA1 and PA2, according to an embodiment of the present invention are described in more detail below.

The first mapping table 1321 maps the logical address LA, corresponding to the logical page of data, to the first physical address PA1 corresponding to a physical page of the first storage region 1510. In this case, a merge operation for page arrangement does not need to be performed because the address mapping operation is performed on a page basis. In contrast, a garbage collection operation for generating a free block by arranging invalid pages needs to be performed. A garbage collection operation is well-known in the art, and a detailed description thereof is omitted.

The second mapping table 1322 may map the logical address LA into the second physical address PA2 by performing address mapping based on a log block. In order to process data based on the log block using the second physical address PA2, the log block may be allocated to the second storage region 1520, and may be used as a write buffer. A detailed configuration and operation is described with reference to FIGS. 13 and 14.

Figure 13:
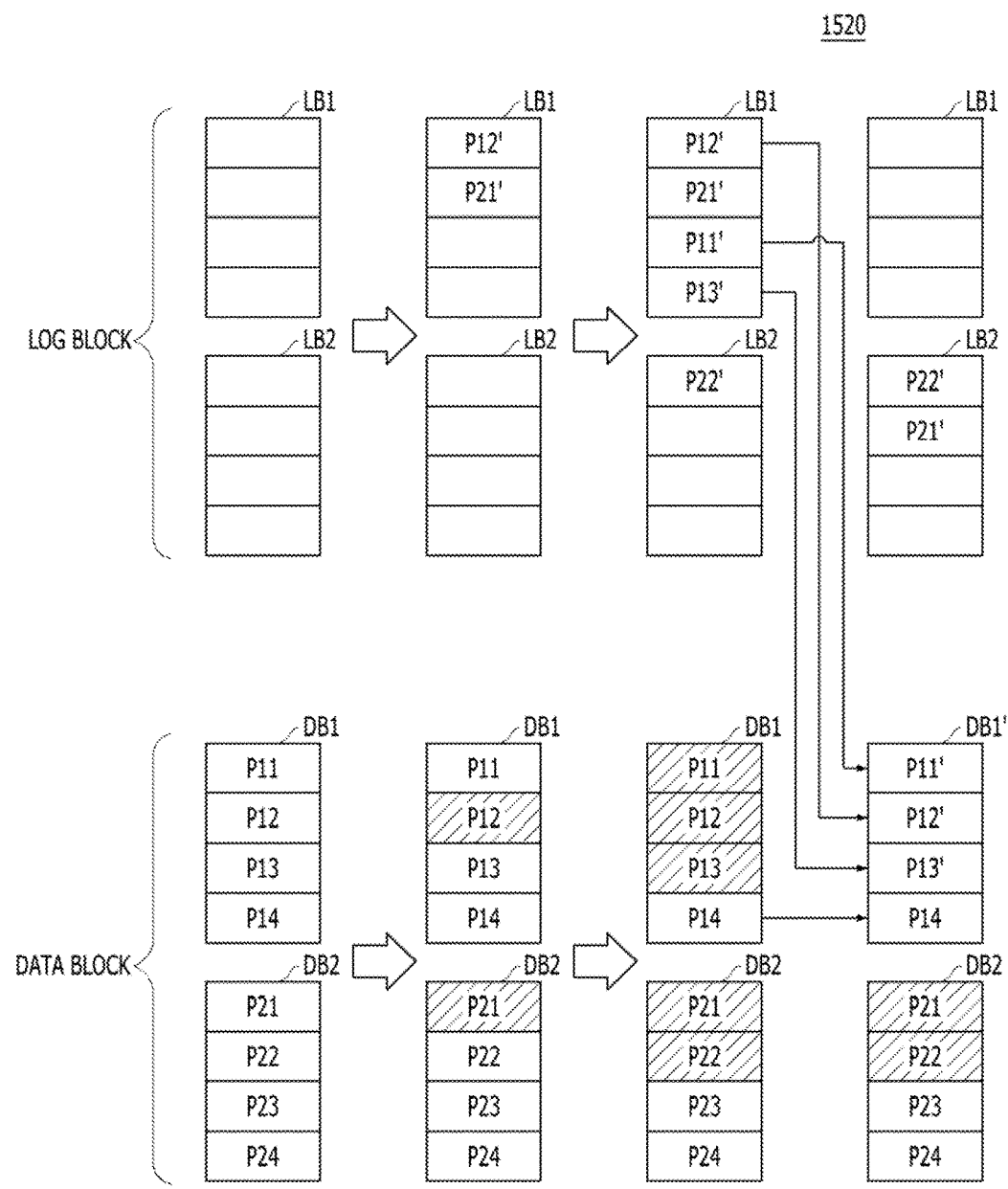
FIGS. 13 and 14 are diagrams showing operations of a second storage region of FIG. 12 in a plurality of sub-operating modes.
Figure 14:
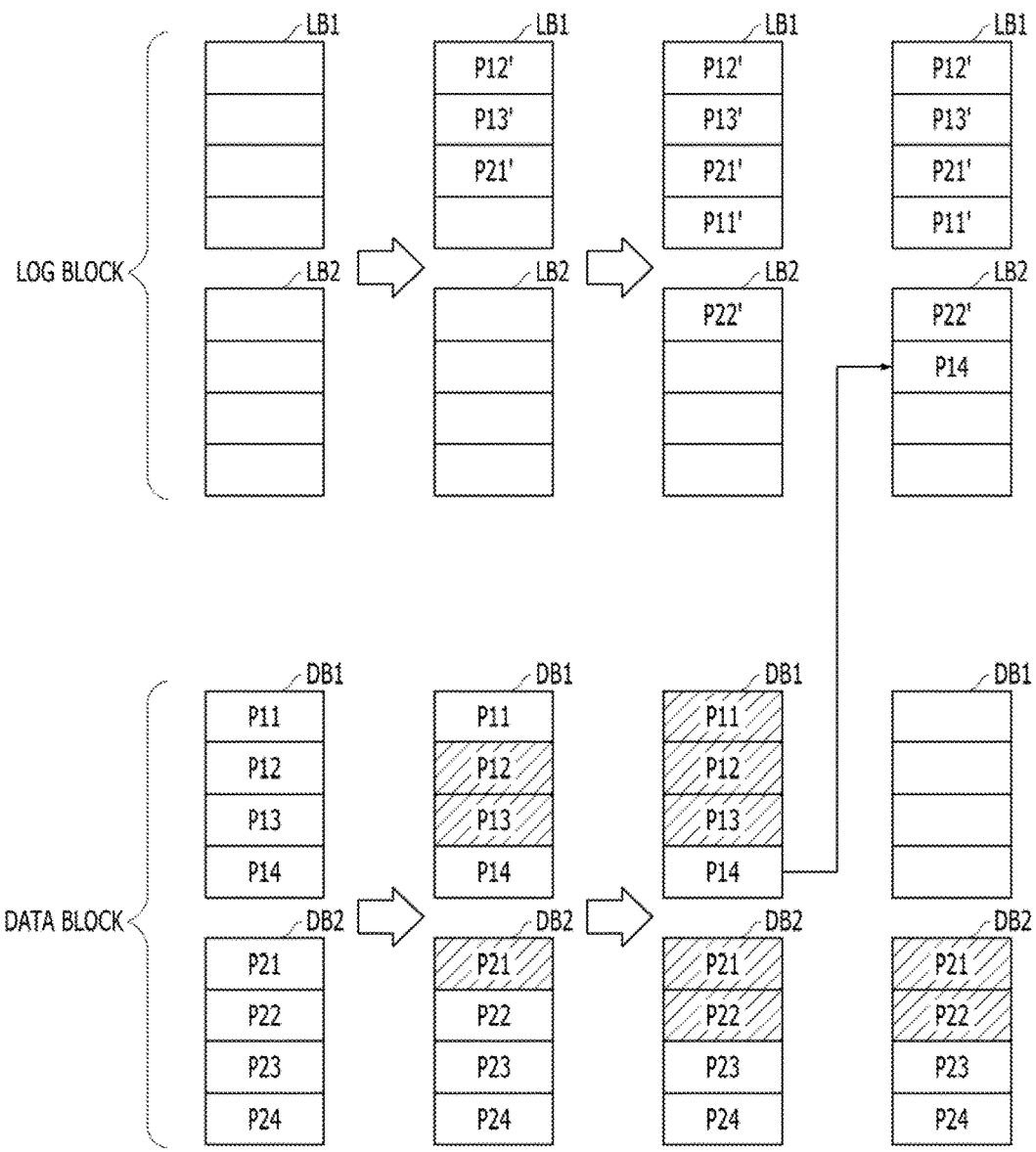

FIGS. 13 and 14 are diagrams showing operations of the second storage region 1520 of FIG. 12 in a plurality of sub-operating modes. Accordingly, the memory system 110 may perform an operation in the plurality of sub-operating modes when performing address mapping based on a log block. To this end, the mode selection unit 1310 of FIG. 12 may check whether a method for accessing data stored in the memory device 150 from the host 102 has temporal locality including information on whether data is hot data that is frequently accessed or cold data that is accessed infrequently. That is, the mode selection unit 1310 may select one of the sub-operating modes depending on whether data is hot data or cold data. Each of the sub-operating modes may be similar to an address mapping method based on a log block, but may be different from the address mapping method in a memory block management method within the second storage region 1520.

FIG. 13 illustrates an operation of the memory system 110 in a full log mode. The memory system 110 may operate in the full log mode when the memory device 150 is accessed from the host 102 chiefly based on cold data.

Referring to FIG. 13, the second storage region 1520 may include a plurality of data blocks DB and log blocks LB used as the write buffers of the data blocks DB. In the present embodiment, two log blocks LB1 and LB2 and two data blocks DB1 and DB2 have been illustrated, but the characteristics of the present invention are not limited thereto. Furthermore, a log block LB may be changed into a data block DB and managed as the data block DB, and vice versa, depending on the degree of remaining blocks, i.e., the type of block is not fixed. Each of the data block DB and the log block LB has been illustrated as including four pages, for example.

A single data block DB may store the data of pages corresponding to a single logical block (now shown) because access to sequential data is made by the host 102, that is, because a method for accessing the memory device 150 from the host 102 has spatial locality. That is, the first data block DB1 stores the sequential data of the pages P11, P12, P13, and P14 of a first logical block, and the second data block DB2 stores the sequential data of the pages P21, P22, P23, and P24 of a second logical block.

In this case, when a request to write new data in an already stored logical page is made, that is, in order to perform updates on the existing data, the memory system 110 needs to perform a write operation after an erase operation. The erase operation of the memory system 110 is performed on a block basis. Accordingly, operation efficiency is inevitably deteriorated because other pages included in a block in addition to a page to be updated are deleted or programmed. Accordingly, only a page in which the existing data is stored may be invalidated, and updated data may be stored in the log block LB operating as a write buffer.

From a first change of FIG. 13, it may be seen that the second page P12 of the first data block DB1 and the first page P21 of the second data block DB2 have been updated. The updated second page P12' and the updated first page P21' are stored in the first log block LB1, that is, a marginal block. The existing corresponding pages P12 and P21 of the first and second data blocks DB1 and DB2 are invalidated (indicated by oblique lines).

In a subsequent write operation, the first and the third pages P11 and P13 of the first data block DB1 and the second page P22 of the second data block DB2 are newly updated. Accordingly, the updated first and the third pages P11' and P13' are stored in the first log block LB1, and the updated second page P22' is stored in the second log block LB2, that is, a marginal block. The existing corresponding pages P11, P13 and P22 of the first and second data blocks DB1 and DB2 are invalidated.

As the memory system 110 continues to perform a write operation, the number of marginal blocks within the data block DB or the log block LB may be gradually reduced. When the number of marginal blocks is reduced and reaches a threshold, marginal blocks may be additionally secured by deleting a data block or a log block. Furthermore, the number of invalid pages may need to be arranged because the operation or storage capacity of the memory system 110 is limited as the number of invalid pages is increased. Which one of the data block DB and the log block LB will be deleted and what type of a block an additionally secured block will be used as may be determined by the number or ratio of remaining blocks. Which block will be deleted even in a determined data block DB or log block LB may be determined based on the number of invalid pages included in a block or the number of programs/erasures of a block.

FIG. 13 illustrates an example of an operation for selecting the first data block DB1 which includes many invalid pages and securing a marginal block by arranging the invalid pages of the first data block DB1. In the full log mode, pages may be arranged by performing a merge operation. That is, a marginal block is secured by merging the first data block DB1 and the first log block LB1 in which valid pages corresponding to the first data block DB1 have been stored. For example, when the number of open blocks of memory blocks of the second storage region 1520 is smaller than a reference value, an open block is secured by merging valid pages of a target block of the data blocks DB and a log block LB corresponding to the target block. At this time, the target block comprises a block which has a largest number of invalid pages or a smallest number of programs/erasures, among the data blocks DB.

Specifically, the first data block DB1 includes three invalid pages P11, P12, and P13 and one valid page P14. Accordingly, the first, the second, and the third valid pages P11', P12', and P13' of the first log block LB1, corresponding to the first, the second, and the third invalid pages P11, P12, and P13 of the first data block DB1, and the fourth valid page P14 of the first data block DB1 may be merged into form a new data block DB1'. The existing first data block DB1 and first log block LB1 may be deleted and changed into marginal blocks. In this case, the first page P21' remaining in the first log block LB1 may be copied into another log block, e.g., the second log block LB2, and processed.

As described above, the memory system 110 configured to perform address mapping based on a log block according to the embodiment of the present invention may perform an operation in a plurality of sub-operating modes.

FIG. 14 illustrates an operation of the memory system 110 in a sub-operating mode different from that of FIG. 13, that is, in a limited log mode. A difference between the sub-operating mode operations can be illustrated in more detail.

Referring to FIG. 14, the memory system 110 may operate in a cyclic buffer mode. The memory system 110 may operate in the cyclic buffer mode when the memory device 150 is accessed from the host 102 chiefly based on hot data. A description of operations similar to the operations of FIG. 13 is omitted.

A single data block DB may also store the data of pages corresponding to a single logical block (not shown). That is, a first data block DB1 stores the sequential data of the pages P11, P12, P13, and P14 of a first logical block, and a second data block DB2 stores the sequential data of the pages P21, P22, P23, and P24 of a second logical block.

It may be seen that the second and the third pages P12 and P13 of the first data block DB1 and the first page P21 of the second data block DB2 are updated in response to a write request. The updated second and the updated third pages P12' and P13' and the updated first page P21' are stored in the first log block LB1, that is, a marginal block. The existing corresponding pages P12, P13 and P21 of the first and second data blocks DB1 and DB2 are invalidated (Indicated by oblique lines).

In a subsequent write operation, the first page P11 of the first data block DB1 and the second page P22 of the second data block DB2 are newly updated, and thus the updated first page P11' is stored in the first log block LB1, and the updated second page P22' is stored in the second log block LB2, that is, a marginal block. The existing corresponding pages P11 and P22 of the first and second data blocks DB1 and DB2 are invalidated.

When the number of marginal blocks is reduced to a threshold due to continued write operations, the memory system 110 may secure a marginal block by deleting a data block. That is, the memory system 110 may secure a marginal space by deleting the first data block DB1 including many invalid pages. For example, when the number of open blocks of memory blocks of the second storage region 1520 is smaller than a reference value, an open block is secured by deleting a target block of one of the data blocks DB and the log blocks LB. At this time, the target block comprises a block which has a largest number of invalid pages or a smallest number of programs/erasures, among the data blocks DB or the log blocks LB, and a valid page included in the target block is copied into the log block LB by checking an importance of the valid page before deleting the target block.

In this case, the memory system 110 may determine the importance of data already stored in the first data block DB1 and rearrange the data. As shown in FIG. 14, the memory system 110 may determine whether the fourth page P14 of the first data block DB1 is valid and copy only the fourth page P14 from the first data block DB1 to the second log block LB2 based on a result of the determination. Furthermore, the first data block DB1 may be deleted, and the pages of a new logical block may be stored.

Likewise, when the number of marginal blocks in the log block LB reaches a threshold and the pages of the log block LB full of the pages may be arranged, the log block LB may be used as a new log block LB. Unlike in the full log mode of FIG. 13, there is a good possibility that relatively frequently inputted hot data may have been stored as update data in the log block LB operating as a write buffer. Furthermore, many spaces may be secured when the log block LB is arranged because all of previous pages are invalidated due to repetitive updates.

That is, in the cyclic buffer mode of FIG. 14 the proportion of a log block LB operating as a write buffer may be increased as compared to the full log mode of FIG. 13, and the log block LB may continue to be cyclically managed. As a result, a ratio of the number of the log blocks LB to the number of the data blocks DB may be greater in the cyclic buffer mode of FIG. 14 than in the full log mode of FIG. 13. In contrast, when sequential data is processed based on a logical address that is not frequently updated, the proportion of a data block DB may be increased, and the data block DB may operate substantially the same as in the full log mode of FIG. 13. Accordingly, the memory system 110 according to the embodiment of the present invention may determine a ratio of a log block to a data block based on a data access method and may selectively operate in the full log mode and the cyclic buffer mode.

Figure 15:
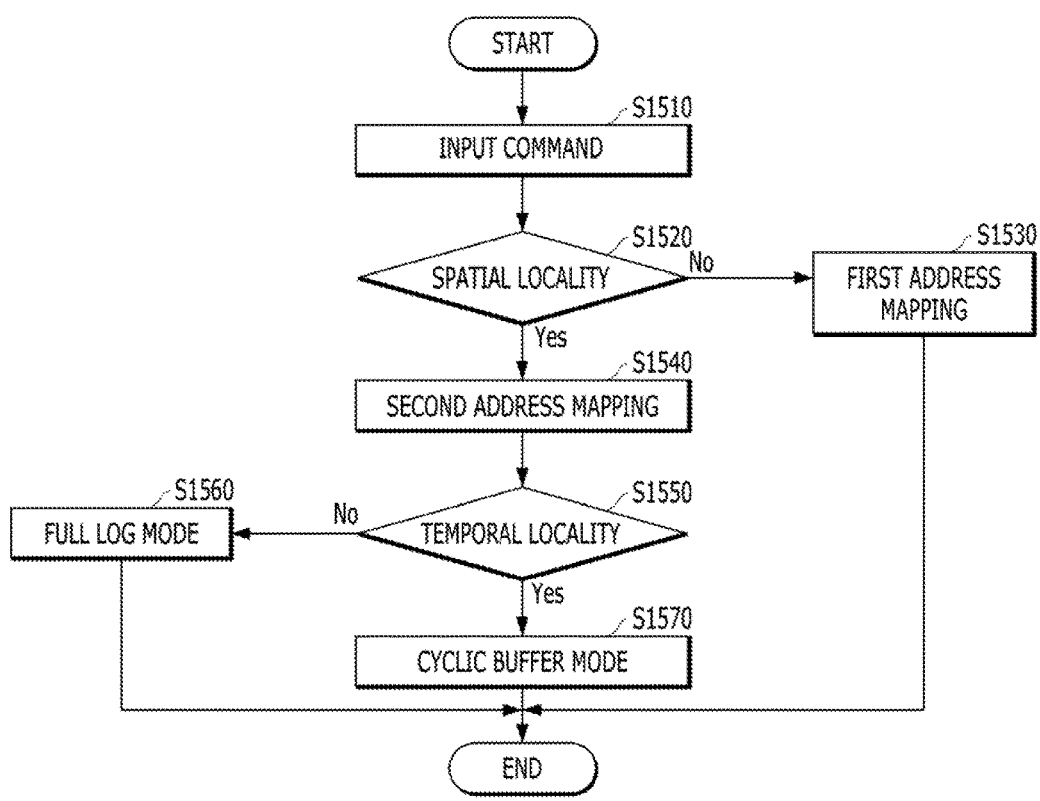
FIG. 15 is a diagram illustrating an overall operation of the memory system of FIG. 12, according to an embodiment of the present invention.

FIG. 15 is a diagram illustrating an overall operation of the memory system 110 of FIG. 12, according to an embodiment of the present invention.

Referring to FIG. 15, when the command CMD is received from the host 102 at step S1510, the memory system 110 may check a method for accessing data corresponding to the command CMD at step S1520. Specifically, the memory system 110 may check whether data stored in the memory device 150 has spatial locality. When the data stored in the memory device 150 is determined to not have spatial locality ('No' at step S1520), that is, when the data is random data, the memory system 110 may perform first address mapping at step S1530. In the first address mapping at step S1530, the first mapping table 1321 of the address mapping unit 1320 may be enabled, and address mapping for the first storage region 1510 of the memory device 150 may be performed based on a page.

In contrast, when the data stored in the memory device 150 is determined to have spatial locality ('Yes' at step S1520), that is, when the data is sequential data, the memory system 110 may perform second address mapping at step S1540. In the second address mapping at step S1540, the second mapping table 1322 of the address mapping unit 1320 may be enabled, and address mapping for the second storage region 1520 of the memory device 150 may be performed based on a log block.

In the second address mapping at step S1540, the memory system 110 may additionally check whether the data stored in the memory device 150 has temporal locality at step S1550. The memory system 110 may perform step S1560 or S1570 based on a result of the check of the temporal locality.

First, when the data stored in the memory device 150 is determined to not have temporal locality ('No' at step S1550), that is, when the data is cold data, the memory system 110 may operate in the full log mode at step S1560. As shown in FIG. 13, the memory system 110 may then secure a marginal block by merging the data block DB and logical block LB of the second storage region 1520 and manage a plurality of memory blocks.

In contrast, when the data stored in the memory device 150 is determined to have temporal locality ('Yes' at step S1550), that is, when the data is hot data, the memory system 110 may operate in the cyclic buffer mode at step S1570. As shown in FIG. 14, the memory system 110 may then increase the proportion of the log block LB of the second storage region 1520 and may secure marginal blocks by continuing to delete and circulate the log block LB.

In accordance with embodiments of the present invention as described above, the number of data updates or the number of data reused may be reduced by separately managing random data and sequential data. Accordingly, a cost attributable to the number of data updates or the number of data reused may be reduced. That is, overhead for the memory system may be reduced because computational efficiency of the memory system is improved by selectively applying a garbage collection or a merge operation based on a data access method.

Furthermore, a total number of programs and or erasures of a memory block may be controlled and the lifespan and performance of the memory system may be maximized by categorizing the data into hot and cold data and flexibly managing a memory block based on whether the data is hot or cold data.

The invention may reduce the number of data updates and or the number of data reused by separately managing random data and sequential data based on a method for accessing data stored in the memory device. This may be advantageous in that computational efficiency of the memory system including the memory device may be improved, for example, by selectively applying a garbage collection or a merger operation based on each access method.

Furthermore, there may be further advantages in that a total number of programs and or erasures of a memory block may be controlled and the lifespan and performance of the memory system may be maximized because a memory block in which data is stored is flexibly managed based on a data access method.

Although various embodiments have been described for illustrative purposes, it will be apparent to those skilled in the art that various changes and modifications may be made without departing from the spirit and or scope of the invention as defined in the following claims.

What is claimed is:

1. A memory system comprising:
   a memory device comprising first and second storage regions, each comprising a plurality of memory blocks; and
   a controller suitable for:
   selecting a first mode or a second mode based on a method for accessing data stored in the memory device; and
   mapping a logical address of the data into a physical address of the first storage region in the first mode and into a physical address of the second storage region in the second mode, wherein the controller additionally selects a plurality of sub-operating modes, in which an open block is secured in the second storage region, depending on whether the data is hot data or cold data, in the second mode.

2. The memory system of claim 1, wherein:

the method for accessing the data comprise spatial locality including information on whether the data is random data or sequential data, and the controller selects the first mode in case of the random data, and selects the second mode in case of the sequential data.

3. The memory system of claim 2, wherein the controller comprising:

a mode selection unit suitable for generating a first selection signal in case of the random data, and a second selection signal in case of the sequential data; and an address mapping unit comprising a first mapping table and a second mapping table enabled in response to the first selection signal and the second selection signal, respectively.

4. The memory system of claim 3, wherein the first mapping table performs address mapping based on a page, and the second mapping table performs address mapping based on a log block.

5. The memory system of claim 1, wherein the controller selects a cyclic buffer mode or a full log mode as the plurality of sub-operating modes depending on whether the sequential data is hot data or cold data.

6. The memory system of claim 5, wherein the memory blocks of the second storage region comprise:

a plurality of data blocks suitable for storing the sequential data; and a plurality of log blocks suitable for operating as a write buffer and storing update data of data stored in the plurality of data blocks.

7. The memory system of claim 6, wherein, when the number of open blocks of the memory blocks of the second storage region is smaller than a reference value in the full log mode, the open block is secured by merging valid pages of a target block of the data blocks and a log block corresponding to the target block.

8. The memory system of claim 7, wherein the target block comprises a block which has a largest number of invalid pages or a smallest number of programs/erasures, among the data blocks.

9. The memory system of claim 6, wherein, when the number of open blocks of the memory blocks of the second storage region is smaller than a reference value in the cyclic buffer mode, the open block is secured by deleting a target block of one of the data blocks and the log blocks and circulating valid pages of the target block.

10. The memory system of claim 9, wherein:

the target block comprises a block which has a largest number of invalid pages or a smallest number of programs/erasures, among the data blocks or the log blocks, and a valid page included in the target block is copied into the log block by checking an importance of the valid page before deleting the target block.

11. The memory system of claim 6, wherein a ratio of the number of the log blocks to the number of the data blocks is greater in the cyclic buffer mode than in the full log mode.

12. An operating method of a memory system, comprising:

determining spatial locality for data stored in a memory device comprising a first storage region and a second storage region, each comprising a plurality of memory blocks;

mapping a logical address of the data into a physical address of one of the first and second storage regions based on a result of the determination; and additionally selecting a plurality of sub-operating modes, in which a marginal block is secured, depending on whether the data is hot data or cold data.

13. The operating method of claim 12, wherein the determining of the spatial locality for the data comprises:

determining whether the data is random data or sequential data.

14. The operating method of claim 13, wherein the mapping of the logical address of the data comprises:

mapping the logical address of the data into the physical address of the first storage region based on a page when the data is the random data; and mapping the logical address of the data into the physical address of the second storage region based on a log block when the data is the sequential data.

15. The operating method of claim 13, further comprising, when the data is the sequential data:

determining temporal locality for the data; and controlling a ratio of log blocks to data blocks of the plurality of memory blocks of the second storage region based on a result of the determination.

16. The operating method of claim 15, wherein the determining of the temporal locality comprises:

determining whether the data is cold data or hot data.

17. The operating method of claim 16, wherein the marginal block is secured by merging the data block and the log block when the data is the cold data.

18. The operating method of claim 16, wherein the marginal block is secured by deleting and circulating the data block or the log block when the data is the hot data.

19. The operating method of claim 15, wherein the controlling of the ratio of the log blocks to the data blocks comprises:

reducing a proportion of the log blocks when the data is cold data; and increasing a proportion of the log block when the data is hot data.

* * * * *